United States Patent [19]
Kober

[11] 3,753,827
[45] Aug. 21, 1973

[54] METHOD OF MAKING LAMINATED ASBESTOS CEMENT PLATES

[75] Inventor: Harald Kober, Wanne-Eickel, Germany

[73] Assignee: G. Siempelkamp & Co., Krefeld, Germany

[22] Filed: May 14, 1971

[21] Appl. No.: 143,569

[52] U.S. Cl............... 156/307, 156/153, 156/314, 156/335, 161/205, 161/258
[51] Int. Cl. ..................... C09j 5/02, B32b 13/04
[58] Field of Search........................ 161/205, 258; 156/71, 153, 307, 314, 335

[56] References Cited
UNITED STATES PATENTS

| | | | |
|---|---|---|---|
| 3,313,675 | 4/1967 | Petropoulos et al............... | 161/205 |
| 1,978,807 | 10/1934 | Merritt............... | 156/153 |
| 3,480,494 | 11/1969 | Wilhelm............... | 161/205 |
| 3,202,596 | 8/1965 | Canevari............... | 156/153 |
| 2,817,614 | 12/1957 | Fraser............... | 156/335 |

Primary Examiner—Charles E. Van Horn
Attorney—Karl F. Ross

[57] ABSTRACT

An asbestos-cement plate or sheet is coated with a resorcinol/formaldehyde dispersion or emulsion which is precondensed in and on the asbestos plate. A melamine/aldehyde foil is then applied and bonded under heat and pressure to the substrate.

4 Claims, 3 Drawing Figures

PATENTED AUG 21 1973 3,753,827

Harald Kober
INVENTOR.

BY
Karl F. Ross
Attorney

METHOD OF MAKING LAMINATED ASBESTOS CEMENT PLATES

FIELD OF THE INVENTION

The present invention relates to a method of making asbestos-cement plates and, more particularly, to a method of making a structural member consisting of an asbestos-cement substrate and a facing layer bonded thereto.

BACKGROUND OF THE INVENTION

Asbestos-cement sheets, boards and plates are known for a number of structural purposes, including the formation of walls, ceilings, roofs and the like, as fire-resistant and heat-insulating members, as separators for the isolation of structural regions, as inserts in steel panels or in panels and walls composed of other materials, etc. It is also known to laminate asbestos-cement plates, which frequently are insufficiently stable against mechanical stress or insufficiently impenetrable to moisture, with outer layers to improve the appearance, strength, resistance to moisture absorption and penetration, etc. Typical laminating materials are melamine/aldehyde foils or laminates such as those marketed under the name FORMICA. Melamine foils, as these laminating members will be termed hereinafter, may be provided in a variety of textures, colors and patterns, and may be relatively thin, with a thickness of the order of tenths of a millimeter or of the order of millimeters, so as to provide only an improved appearance and increased resistance to moisture penetration, or to increase the structural integrity of the board. These foils are also employed, as described by KOLLMANN, "Spannplatten," Werkstoffe, 1965, pages 406 and 411–413, as laminating foils for wood-chip, wood-fiber and composition board.

In the lamination of the asbestos-cement plates with cover foils, especially melamine foils, it has been proposed to apply the foil directly to the asbestos plate under heat and pressure, utilizing the plastic character of the foil. This technique has proved to be unsatisfactory since the foil readily separates from the substrate. The adhesion, moreover, is a function of the moisture content of the asbestos-cement plate and the moisture content after bonding or laminating is likewise of considerable significance.

To improve the adhesion it has been proposed to provide an adhesive layer between the foil and substrate and to effect the bonding, via this adhesive layer, under heat and pressure. Where the adhesive layer was a foil of a phenolic resin, this method increased the cost of the process so as to render the same prohibitive. Other coating systems have proved to be unsatisfactory for various reasons, including the ready separation of the laminating layer, insufficient resistance to mechanical stress, dependency on the moisture content of the plate, etc. To avoid all of these disadvantages, attention has been directed away from the laminating of foils to the substrate and has concentrated on the coating of the latter with enamels. Even this latter system has a disadvantage in that baking or flow-inducing heating of the structure is required for a fully effective coating. Such heating stages, amounting to a firing in a kiln, are so expensive as to be prohibitive for many possible uses of asbestos-cement plates.

OBJECTS OF THE INVENTION

It is the principal object of the present invention to provide an improved asbestos-cement structure whereby the forementioned disadvantages can be obviated.

Yet another object of the invention is the provision of a low-cost method of making laminated asbestos-cement plates whereby the aforedescribed disadvantages are avoided and the board can be produced at low cost.

It is yet another object of the invention to provide a method of making coated asbestos-cement plates in which a firing step can be avoided.

It is also an object of the invention to provide a laminated asbestos-cement board with improved strength and moistureresistant properties, and a method of making such board, wherein the coating layer is not readily separable from the substrate and the process does not significantly depend on the moisture content of the substrate.

SUMMARY OF THE INVENTION

These objects and others which will become apparent hereinafter are attained, in accordance with the present invention, by a method of making a laminated plate wherein an asbestos-cement substrate is coated along its surface and at least partially penetrated by a suspension of a synthetic-resin binder in water, the binder being preferably thermally activated. According to this invention, the binder suspension is at least partially dried on the substrate, whereupon a laminating foil of an aldehyde-condensate resin, preferably a melamine foil, is applied and bonded to the surface treated with the suspension under heat and pressure. The binder is advantageously a thermosetting resin at least partially cured, condensed or polymerized in situ.

The advantages of the present system are that the abestos-cement plate needs no specific pretreatment in advance of application of the suspension, that the final bonding under heat and pressure cures the adhesive resin to form a substantially monolithic bond with the melamine foil and a network of tentacles penetrating into the body of the asbestos-cement substrate and resulting from the final polymerization of the ad-hesive resin in the body of the asbestos-cement plate, and that the moisture content of the substrate does not impair the effectiveness of the adhesive since the latter is used in an aqueous suspension.

According to a more specific feature of this invention, the suspension is an aqueous dispersion or emulsion of an aldehyde-condensation resin, preferably of the type broadly described as a phenol-aldehyde (e.g. phenol-formaldehyde). Such resins, when used in aqueous dispersion or emulsions with asbestos-cement substrates and melamine laminating foils, can be applied in an incompletely condensed state of the adhesive resin and dried on the surface with heating, preferably radiant heating from an infrared source. The drying operation results in a precondensation not only of the surface layers, but also of the trails or tentacles of the adhesive coating which penetrate by capillary action into the asbestos-cement substrate. The adhesive layer should be of such viscosity and rheology that at least some of the adhesive component passes into the capillary channels of the substrate. Surface-active agents may be supplied to increase the penetration of the adhesive layer into the substrate, although such surfactants as are generally present in the dispersion or emulsion may serve for this purpose. The final condensation of the adhesive resin is effected under the heat and pressure by which the foil is bonded to the substrate.

Surprisingly, a highly effective cross-linking of the adhesive resin to the foil resin results when the adhesive resin is a resorcinol-formaldehyde resin which is dried to a hard (nontacky) state upon and in the substrate. Advantageously, the foil may have its surface in contact with the adhesive resin roughened to increase this bonding surface area. It will be understood that the dispersion may be of large particle size, wherein the particles of the dispersion are discernable to the naked eye, or a fine dispersion in which the particles are almost colloidal or are solubilized.

DESCRIPTION OF THE DRAWING

The above and other objects, features and advantages of the present invention will become more readily apparent from the following description reference being made to the accompanying drawing in which.

SPECIFIC DESCRIPTION

Figure 1:
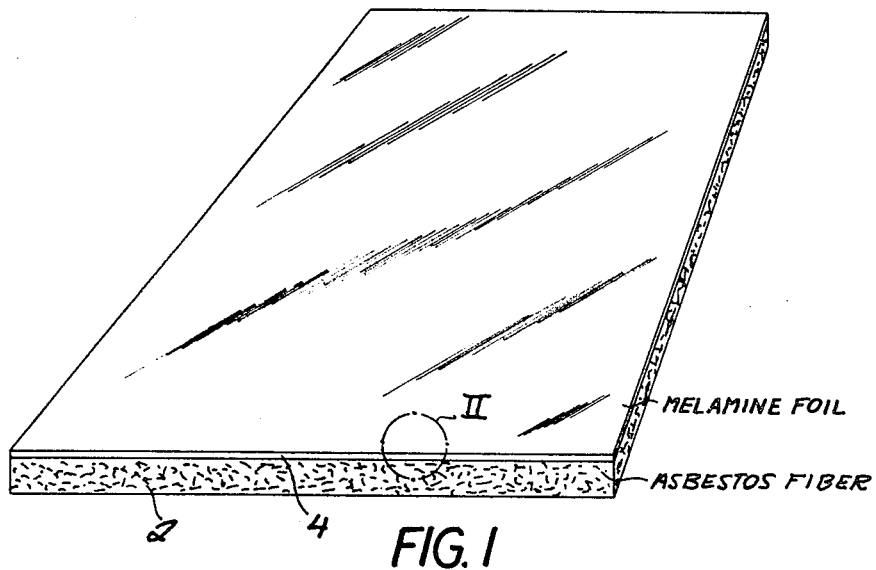
FIG. 1 is a perspective view of an asbestos-cement plate embodying the invention.
Figure 2:
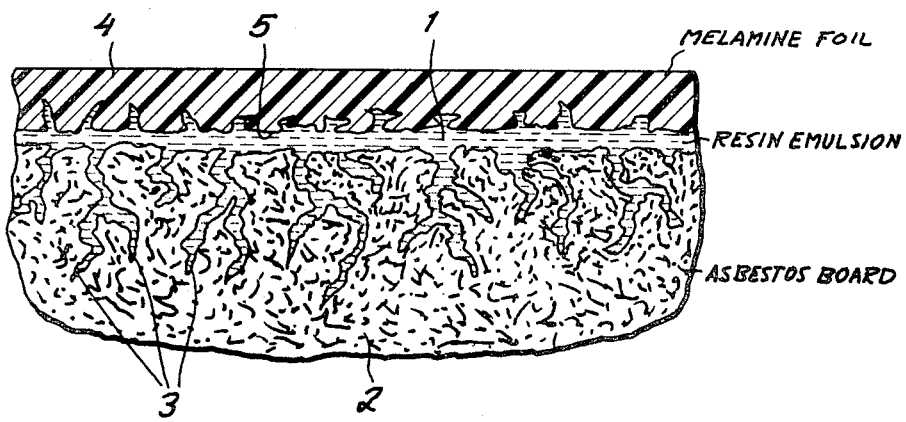
FIG. 2 is a detail cross-section taken in the region II of FIG. 1.

In FIGS. 1 and 2 there is shown an asbestos-cement plate 2 which is coated along its upper surface with a resin emulsion 1 of a resorcinol-formaldehyde dispersion in water, which penetrates into the capillary channels of the asbestos-cement plate as shown by the tentacles 3. The melamine foil 4, the underside 5 of which is roughened to permit penetration of the adhesive resin, is applied under heat and pressure to form a polymeric bond to its interface with the adhesive resin which, in turn, is hardened at the surface of the asbestos-cement plate and at the tentacles reaching into the body of this plate.

Figure 3:
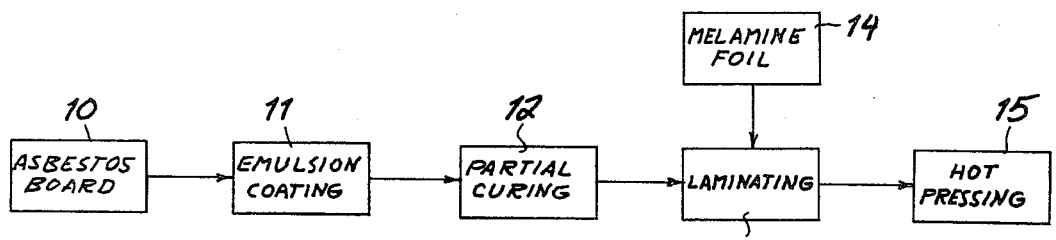
FIG. 3 is a flow diagram illustrating the method of the present invention.

In FIG. 3, the method of the present invention is diagrammed. According to the invention, asbestos cement board is prepared at 10 in the usual manner and is coated at 11 with a resorcinol/formaldehyde emulsion to permit complete coverage of the surface of the board and penetration of the emulsion into the body thereof. The application of the suspension coating is continued until a free liquid surface appears over the entire area of the substrate. The emulsion is partially cured at 12 under infrared heaters to surface hardness or until tackiness disappears, whereupon the foil prepared at 14 is applied in the laminating stage 13. The laminate is pressed in a heated-platen multi-platen press 15 at the curing temperature of the resin and with a pressure between 10 and 200 kg/cm$^2$.

SPECIFIC EXAMPLE

An asbestos-cement board having a thickness of about 5mm and conforming to Federal (U.S. Government) specification SS–S–283 Type III is coated with a resorcinol/formaldehyde emulsion containing 0.5 mole of formaldehyde per mole of resorcinol. 65 parts by weight of this resin mixture was emulsified with 1 percent by weight of phenolsulfonic acid-formaldehyde condensate (surfactant) in accordance with British Pat. No. 523,222 in 35 parts by weight of water. The emulsion was applied until the surface of the asbestos-cement board was completely flooded. The board was then placed under infrared lamps and dried until the adhesive surface was dry to the touch and nontacking. Analysis showed that approximately 50 percent of total condensation had occurred. A melamine foil, having a thickness of 0.75mm and a surface roughened on its underside by wire wheels, was then applied and the plate pressed in a multi-platen press at a temperature of about 160° C and a pressure of about 50 kg/cm$^2$ until curing was complete (several minutes). The laminate could not be separated without complete rupture of the substrate structure. It was found that formaldehyde/resorcinol ratios of 0.05 to 1.5 moles of formaldehyde per mole of resorcinol were effective and that the surface-active agents of U.S. Pat. Nos. 3,262,897 and 3,298,895 could be used effectively as emulsifiers. The emulsion may employ from 5 to 95 parts by weight of the resin with 95 to 5 parts by weight water as required; surfactant concentrations of 0.01 to about 10 percent are suitable.

I claim:

1. A method of making a plate, comprising the steps of coating a surface of a porous asbestos-cement substrate with an aqueous suspension of a thermosetting formaldehyde/resorcinol-resin binder and permitting said suspension to penetrate into said substrate; at least partially drying and effecting partial condensation of said suspension within and on the surface of said substrate; applying a melamine foil to the surface coating with said suspension; and bonding said foil to the resin of said suspension and to said substrate under heat and pressure for a period and at a temperature sufficient to complete curing of said formaldehyde-resorcinol binder and crosslink same with said foil.

2. The method defined in claim 1 wherein said suspension is dried under infrared radiation.

3. The method defined in claim 2, further comprising the step of roughening the underside of said foil prior to exposing same upon said suspension.

4. A method of making a plate, comprising the steps of coating a surface of a porous asbestos-cement substrate with an aqueous suspension of a thermosetting formaldehyde/resorcinol resin binder and permitting said suspension to penetrate into said substrate;at least partially drying said suspension on said substrate by subjecting the same to infrared radiation; applying a melamine foil to the surface of said substrate coated with said suspension subsequent to the treatment thereof with infrared radiation; and bonding said foil to said resin and to said substrate under heat and pressure for a period and at a temperature sufficient to crosslink said formaldehyde-resorcinol binder to said foil and anchor said foil to said substrate through tentacles of the resin penetrating the substrate.

* * * * *